United States Patent [19]

Kishizawa et al.

[11] Patent Number: 4,787,293
[45] Date of Patent: Nov. 29, 1988

[54] HYDRAULIC SYSTEM FOR WORKING VEHICLES

[75] Inventors: Yuji Kishizawa; Sadanori Nishimura, both of Wako, Japan

[73] Assignee: Honda Giken Kogyo Kabushiki Kaisha, Tokyo, Japan

[21] Appl. No.: 63,060

[22] Filed: Jun. 17, 1987

[30] Foreign Application Priority Data

Jun. 17, 1986 [JP] Japan .................. 61-141031

[51] Int. Cl.⁴ .............................. F15B 11/08
[52] U.S. Cl. ...................... 91/443; 91/445; 91/447
[58] Field of Search ............... 91/444, 445, 446, 447, 91/461, 420, 443; 60/376; 417/311

[56] References Cited

U.S. PATENT DOCUMENTS

| | | | |
|---|---|---|---|
| 2,633,803 | 4/1953 | Carey | 417/311 |
| 3,088,283 | 5/1963 | Furia et al. | |
| 3,500,721 | 3/1970 | Allen | 91/444 X |
| 3,623,509 | 11/1971 | Sesseler | 91/26 X |
| 3,972,267 | 8/1976 | Haak et al. | 91/445 |
| 4,221,156 | 9/1980 | Zirps et al. | 91/447 X |
| 4,344,355 | 8/1982 | Schwerin | 91/447 X |

FOREIGN PATENT DOCUMENTS

| | | |
|---|---|---|
| 3247420 | 7/1984 | Fed. Rep. of Germany ........ 91/447 |
| 48-20841 | 6/1973 | Japan . |
| 55-26562 | 6/1980 | Japan . |
| 48-4403 | 1/1983 | Japan . |
| 58-14562 | 3/1983 | Japan . |
| 61-2830 | 1/1986 | Japan . |

Primary Examiner—Edward K. Look
Attorney, Agent, or Firm—Armstrong, Nikaido, Marmelstein & Kubovcik

[57] ABSTRACT

A hydraulic system for raising and lowering a working machine in a working vehicle such as agricultural tractors, which comprises a hydraulic cylinder, a hydraulic pump, an oil tank, a manual valve shiftable between three positions: a stationary position in which a working oil discharged from said hydraulic pump is released into the oil tank; a raised position in which the working oil is supplied into the hydraulic cylinder; and a lowered position in which the working oil supplied into the hydraulic cylinder is passed back into the oil tank, and a check valve for permitting only a flow of the working oil from the manual valve toward the hydraulic cylinder.

14 Claims, 11 Drawing Sheets

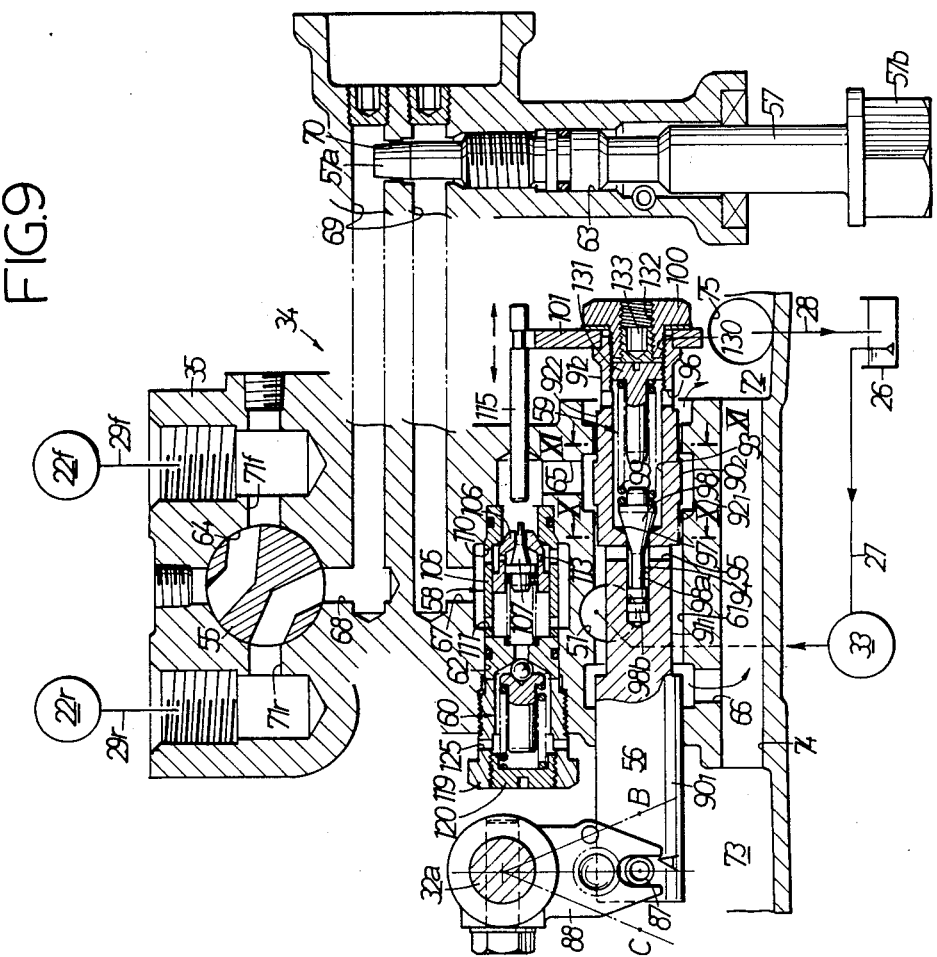
FIG.9
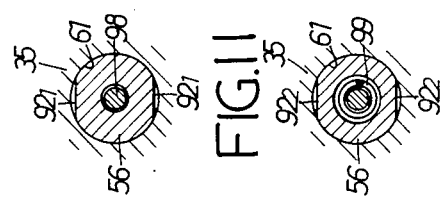
FIG.10
FIG.11

HYDRAULIC SYSTEM FOR WORKING VEHICLES

BACKGROUND OF THE INVENTION

1. Field of the Invention

The present invention relates to a hydraulic system for use in working vehicles such as agricultural tractors.

2. Description of the Prior Art

For the purpose of raising and lowering a working machine carried on such a vehicle, a conventional hydraulic system comprises, for example, as disclosed in Japanese Patent Publication No. 20841/73, a hydraulic cylinder operable to raise and lower the working machine; a hydraulic pump; an oil tank; a manual valve constructed to be shiftable to a stationary position in which a working oil discharged from the hydraulic pump is released into the oil tank, a raised position in which the working oil is supplied into the hydraulic cylinder, and a lowered position in which the working oil supplied into the hydraulic cylinder is passed back into the oil tank; and a check valve interposed in an oil passage between the manual valve and the hydraulic cylinder for permitting a flow of the working oil in a normal direction from the manual valve toward the hydraulic cylinder and blocking a flow of the working oil in the reverse direction. In such known hydraulic system, the working machine can be lowered by its own weight. For this reason, a by-pass detouring the check valve is connected to an oil passage between the hydraulic cylinder and the manual valve, so that the working oil from the hydraulic cylinder can be passed through the by-pass and the manual valve back into the oil tank. But, when the manual valve has been shifted to the stationary position to maintain the working machine in the current position, the working oil intended to flow from the hydraulic cylinder through the by-pass back into the oil tank must be blocked by the manual valve.

In general, however, the manual valve is not so excellent in oil passage-closing function as the check valve and hence, it is difficult to reliably maintain the now position of the working machine for a long time.

There is also known a hydraulic system for a working vehicle having two working machines carried, for example, on its front and rear portions, which comprises a pair of hydraulic cylinders; a switch valve for permitting an output of a manual valve to selectively communicate with either of the pair of hydraulic cylinders; a pressure control valve which is opened upon application of an overload to the hydraulic cylinder selectively put into communication by the switch valve, thereby escaping a working oil within that hydraulic cylinder into the oil tank; and a throttle valve for throttling an oil passage to limit the operational speed of the hydraulic cylinder selectively put into communication by the switch valve. In such hydraulic system, when the working vehicle is left to stand for a long time, it is necessary to previously prevent the issuing of the working oil from each of the hydraulic cylinders in order to maintain the working machine stationary in the current position. For this purpose, for example, Japanese Utility Model Publication No. 4403/83 teaches the use of a stop valve capable of timely closing an oil passage for every cylinder. With this construction, the stop valves are required as many as two and therefore, the number of valves used in the whole apparatus may be necessarily increased, resulting in a difficulty to avoid increases in size and cost.

SUMMARY OF THE INVENTION

It is therefore a primary object of the present invention to provide a hydraulic system which is of a relatively simple construction and is inexpensive and compact, wherein a working machine can be reliably maintained in the current position even for a long time when a manual valve is in a stationary position.

In a first aspect of the present invention, the above object is accomplished by providing a hydraulic system comprising: a hydraulic cylinder operable to raise and lower the working machine; a hydraulic pump; an oil tank; a manual valve constructed to be shiftable to a stationary position in which a working oil discharged from the hydraulic pump is released into the oil tank, a raised position in which the working oil is supplied into the hydraulic cylinder, and a lowered position in which the working oil supplied into the hydraulic cylinder is passed back into the oil tank; and a check valve interposed in an oil passage between the manual valve and the hydraulic cylinder for permitting a flow of the working oil in a normal direction from the manual valve toward the hydraulic cylinder and blocking a flow of the working oil in the reverse direction, wherein the check valve comprises a main valve seat formed on the way of the oil passage between the manual valve and the hydraulic cylinder to permit flowing of the working oil therethrough; a main valve cooperating with the main valve seat to permit flowing of the working oil in the normal direction from the manual valve toward the hydraulic cylinder and to block flowing of the working oil in the reverse direction; a sub-valve seat formed in the main valve to permit flowing of the working oil therethrough; a sub-valve having a pressure-receiving area smaller than that of the main valve seat and cooperating with the sub-valve seat to permit flowing of the working oil in the normal direction from the manual valve toward the hydraulic cylinder and to block flowing of the working oil in the reverse direction; and a valve-opening rod mounted in an opposed relation to the main and sub valves and operable to open the sub-valve prior to the main valve, the valve opening rod being operatively connected to the manual valve so that it becomes operative in the source of shifting of the manual valve from the stationary position to the lowered position.

With such construction, when the manual valve is in the stationary position, the check valve is maintained in a closed state under the influence of the hydraulic pressure of the hydraulic cylinder by the own weight of the working machine. This ensures that flowing of the working oil from the hydraulic cylinder back to the oil tank can be reliably blocked, thereby maintaining the working machine in the current position.

If the manual valve is shifted to the lowered position, the valve opening rod is operated in response to this shifting to open at first the sub-valve and then the main valve, so that the working oil in the hydraulic cylinder can flow through the sub-valve seat and the main valve seat back into the oil tank to allow lowering of the working machine.

In this case, a small force suffices for opening for sub-valve, because the latter has a small pressure-receiving area and it is closed by a relatively small force provided by the hydraulic pressure. When the sub-valve is opened, the working oil in the hydraualic cylinder starts to flow through the sub-valve seat back to the oil tank, so that a difference in pressure applied to the main valve is reduced and hence, a main valve-opening force provided by the hydraulic pressure is also reduced. Therefore, a small force suffices even for opening the main valve.

In a second aspect of the present invention, there is provided a hydraulic system comprising: a pair of hydraulic cylinders operable to raise and lower working machines; a hydraulic pump; an oil tank; a manual valve constructed to be shiftable to a stationary position in which a working oil discharged from the hydraulic pump is released into the oil tank, a raised position in which the working oil is supplied into the hydraulic cylinder, and a lowered position in which the working oil supplied into the hydraulic cylinder is passed back into the oil tank; a switch valve interposed in an oil passage between the manual valve and the pair of hydraulic cylinders for permitting an output side of the manual valve to selectively communicate with either of the pair of hydraulic cylinders; a pressure control valve which is opened upon application of an overload to the hydraulic cylinder selectively put into communication by the switch valve, thereby escaping a working oil within that hydraulic cylinder into the oil tank, and a throttle valve for throttling the oil passage to limit the operational speed of the hydraulic cylinder selectively put into communication by the switch valve, wherein the throttle valve is interposed in the oil passage between the switch valve and the pressure control valve and operable to close that oil passage. With such construction, if the throttle valve is closed, the oil passage between the switch valve and the pressure control valve is thereby closed. Therefore, the working oil in one of the hydraulic cylinders selectively put into communication is prevented from issuing therefrom by the throttle valve. In addition, the working oil in the other hydraulic cylinder is prevented from issuing therefrom by the switch valve. This makes it possible to maintain the both of the hydraulic cylinders in their stationary states for a long time, irrespective of the magnitude of load applied to them, eliminating the necessity for a stop valve used only therefor and largely contributing to a simplification of construction and a reduction in cost.

The above and other objects, features and advantages of the invention will become apparent from reading of the following description of the preferred embodiment, taken in conjunction with the accompanying drawings.

BRIEF DESCRIPTION OF THE DRAWINGS

Drawings illustrate one embodiment of the present invention, wherein

FIG. 9 is a vertical sectional view of the control valve arrangement;

FIG. 10 is a sectional view taken along lines X—X in FIG. 9;

FIG. 11 is a sectional view taken along lines XI—XI of FIG. 9; and

DESCRIPTION OF THE PREFERRED EMBODIMENT

Figure 1:
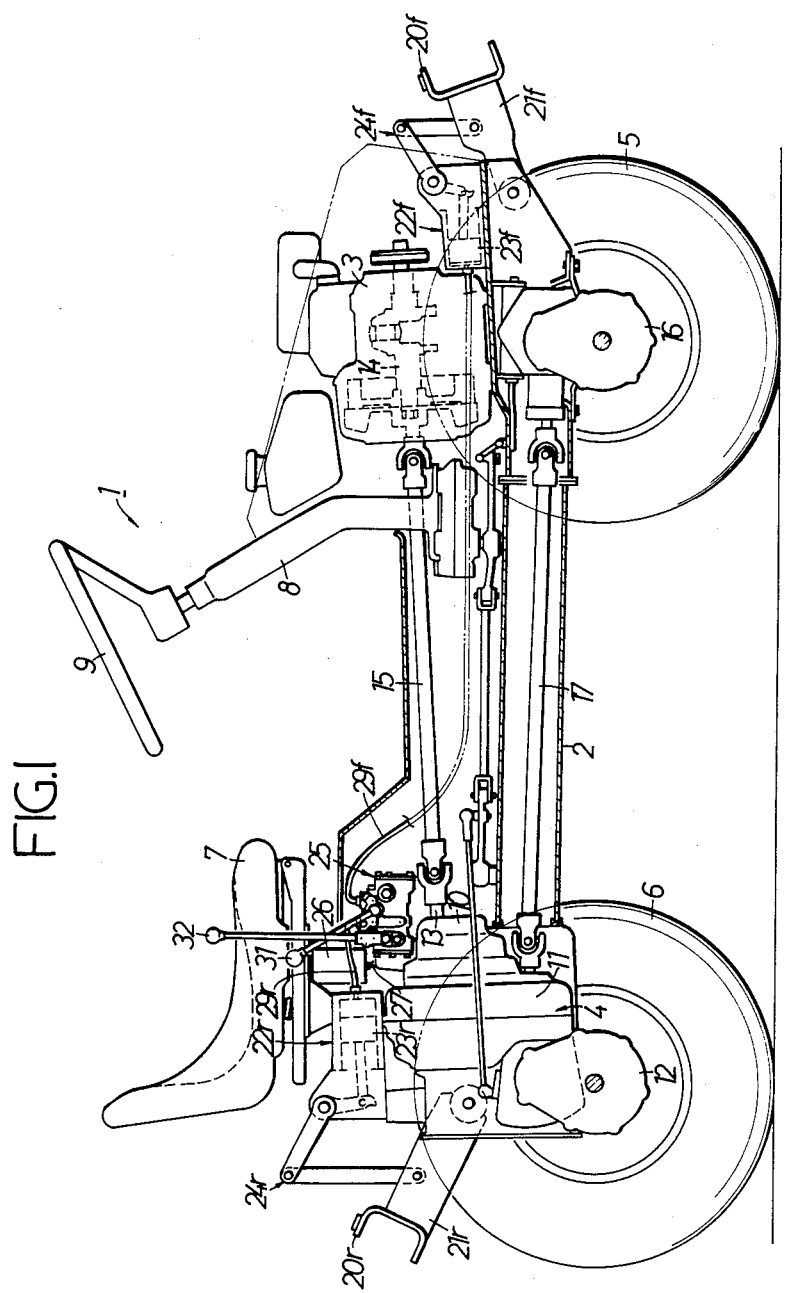
FIG. 1 is a side view of an agricultural tractor as a working vehicle.

One embodiment of the present invention will now be described with reference to the accompanying drawings. Referring first to FIG. 1, the reference numeral 1 designates an agricultural tractor having a vehicle body frame 2. At a front portion of the vehicle body frame 2, an engine 3 is carried and a pair of left and right front wheels 5 are steerably suspended. Also, at a rear end of the vehicle body frame 2, a transmission unit 4 is mounted, and a pair of left and right rear wheels 6 are steerably suspended at the lower portion of the transmission unit 2. A seat 7 for worker is placed above the transmission unit 4.

A steering column 8 is mounted on the body frame 2 at the middle between the seat 7 and the engine 3 to rise thereon, and a steering wheel 9 is pivotably supported by steering column 8 for steering the front and rear wheels 5 and 6.

The transmission unit 4 comprises a clutch 10, a speed change gear 11 and a rear differential gear 12, which are integrally connected. A crank shaft 14 of the engine 3 is connected through a drive shaft 15 to an input shaft 13 of the clutch 10. The rear differential gear 12 is disposed between the left and right rear wheels 6, 6 for driving them. A front differential gear 16 is also disposed between the left and right front wheels 5, 5 for driving them, and has an input member connected through a propeller shaft 17 to an output shaft of the speed change gear 11.

Thus, during operation of the engine 3, a power therefrom is transmitted via the drive shaft 15, the clutch 10, the speed change gear 11 and the rear differential gear 12 to the rear wheels 6 and further from the speed change gear 11 through the propeller shaft 17 to the front wheels 5, so that all of the wheels can be simultaneously driven.

A front lift arm 21f is vertically swingably pivoted at the front end of the body frame 2 and includes, at its front end, a hitch box 20f for connection of a working machine. A front hydraulic cylinder 22f is placed on the body frame 2, and a piston 23f is received in the cylinder 22f and connected through a link mechanism 24f to the front lift arm 21f, so that hydraulically driving of the piston 23f causes the front lift arm 21f to move up, whereas releasing of the hydraulic pressure causes the lift arm 21f to move down by its own weight.

In addition, a rear lift arm 21r is vertically swingably pivoted at the rear end of the transmission unit 4 and includes a hitch box 20r at its rear end. A rear hydraulic cylinder 22r is placed on the transmission unit 4, and a piston 23r is received in the cylinder 22r and connected through a link mechanism 23r to the rear lift arm 21r, so that hydraulically driving of the piston 23r causes the rear lift arm 21r to move up, whereas releasing of the hydraulic pressure causes the lift arm 21r to move down by its own weight.

A hydraulic pressure control unit 25 is attached to the transmission unit 4 for controlling the operation of the front and rear hydraulic cylinders 22f and 22r. The hydraulic pressure control unit 25 communicates with an oil tank 26 placed adjacent thereto, through an intake pipe 27 and a return pipe 28 (see FIG. 9) and also with hydraulic oil chambers in the front and rear hydraulic cylinders 22f and 22r through hydraulic conduits 29f and 29r, for transfer of a working oil drawn thereinto to the cylinders 22f and 22r and to the oil tank 26 under pressure.

In addition, the hydraulic pressure control unit 25 includes first and second control levers 31 and 32 disposed at one side of the seat 7. The operation of either the front or rear hydraulic cylinder 22f or 22r can be selected by the operation of the first control lever 31, while supplying of a hydraulic pressure into the selected hydraulic cylinder 22f or 22r and cutting-off of such supply can be controlled by the operation of the second control lever 32.

The hydraulic pressure control unit 25 will be described below in more detail with reference to FIGS. 2 through 12.

Figure 2:
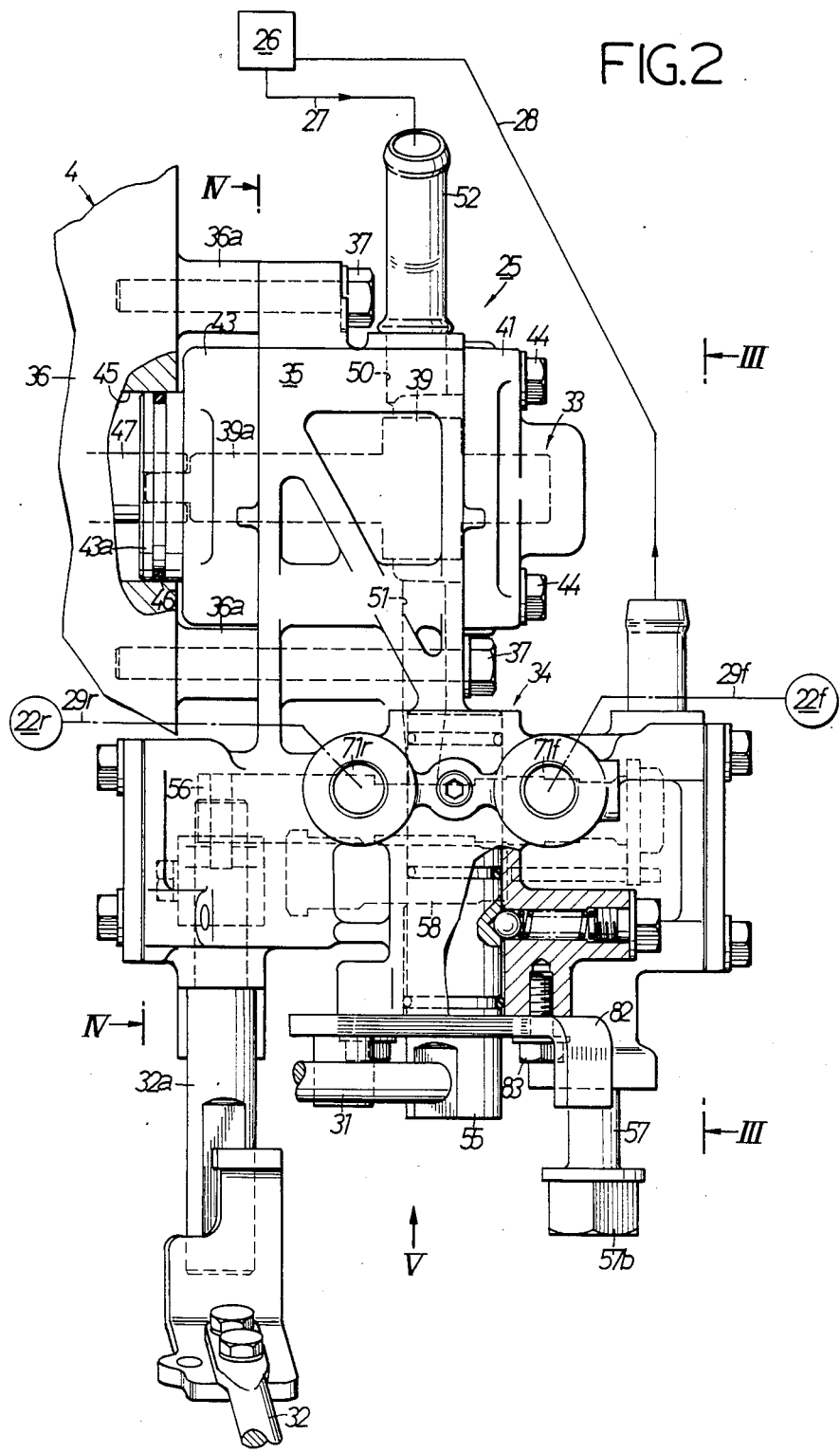
FIG. 2 is a plan view of a unit of hydraulic pump and control valve arrangement in a hydraulic system for the agricultural tractor.
Figure 4:
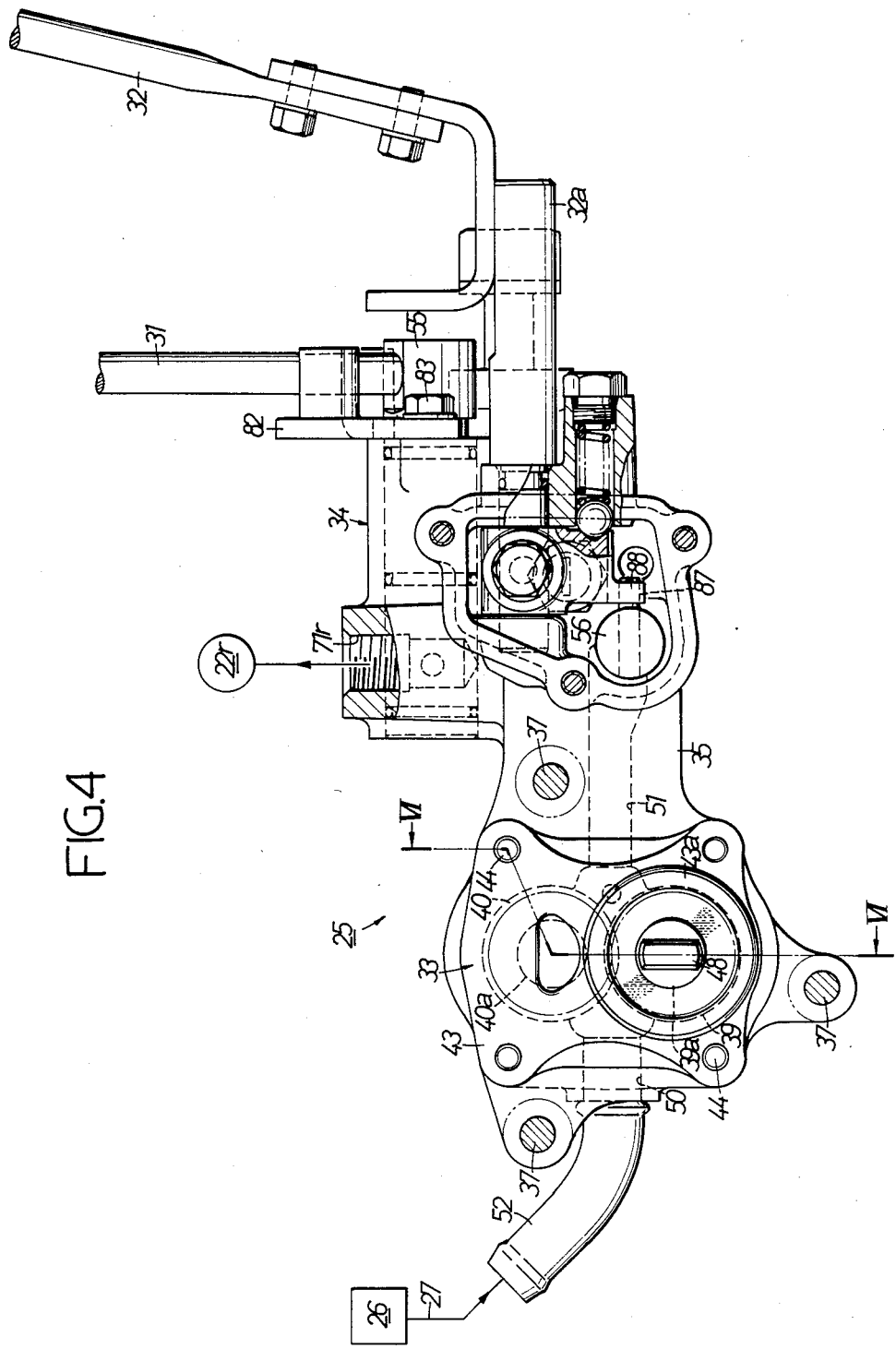
FIG. 4 is a sectional view taken along lines IV—IV in FIG. 2.

As shown in FIGS. 2 and 4, the hydraulic pressure control unit 25 comprises a hydraulic pump 33 and a control valve arrangement 34, both of which are arranged adjacent to each other in a lateral direction of the tractor 1 and use a common casing 35 for unit assembling. The hydraulic pressure control unit 25 can be attached to the transmission unit 4 by securing the casing 35 to a plurality of bosses 36a projecting from the front surface of the casing 36 of the transmission unit 4 by a plurality of bolts 37.

Figure 6:
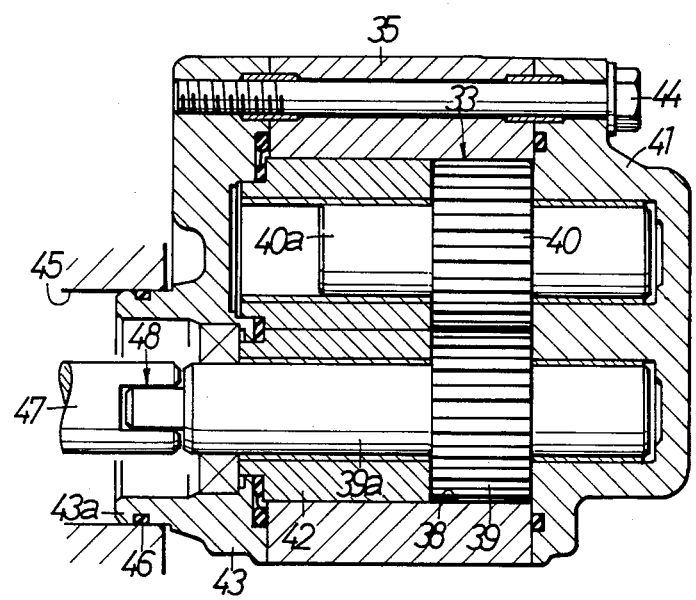
FIG. 6 is a sectional view taken along a line VI—VI in FIG. 4.

The hydraulic pump 33 is constructed into a gear type including a pair of pump gears 39 and 40 contained in a gear chamber 38 in the casing 35 and meshed with each other, as shown in FIG. 6. Respective shafts 39a and 40a of the pump gears 39 and 40 are borne at their one ends on a front end plate 41 for closing a front face of the gear chamber 38 and at the other ends on a bearing block 42 which is fitted in the gear chamber 38 along with the pump gears 39 and 40. The bearing block 42 is positioned in a fit relation to a rear end plate 43 for closing a rear face of the gear chamber 38. The end plates 41 and 43 are interconnected by a plurality of through bolts 44 with the casing 35 sandwiched therebetween.

A connecting tube 43a, into which is inwardly projected a shaft 39a of one of the pump gears 39, is integrally provided on a back surface of the rear end plate 43. In attaching the casing 35 to the transmission unit 4, the connecting tube 43a is fitted through a seal member 46 into a power take-off port 45 opened in the casing 36 of the transmission unit 4, and the shaft 39a of the pump gear 39 is connected through a joint 48 to a pump drive shaft 47 interlocking with the input member of the clutch 10. Thus, in the transmission unit 4, the hydraulic pump 33 is driven by the input member of the clutch 10 and hence, during operation of the engine 3, the hydraulic pump can be normally maintained operative to assure the hydraulic pressure, irrespective of the engagement or disengagement of the clutch 10.

An intake port 50 and a discharge port 51 opened into the gear chamber 38 are perforated in the casing 35, with the meshed portion of both the pump gears 39 and 40 being interposed therebetween (see FIG. 2). The ports 50 and 51 are rectilinearly arranged in parallel to the direction of arrangement of the hydraulic pump 33 and the control valve arrangement 34. Such arrangement is effective for easy removal of a shell core in each portion through the ports 50 and 51 after casting of the casing 35.

A short connecting pipe 52 is fitted over an inlet of the intake port 50, and the intake pipe 27 is connected to the connecting pipe 52.

Figure 7:
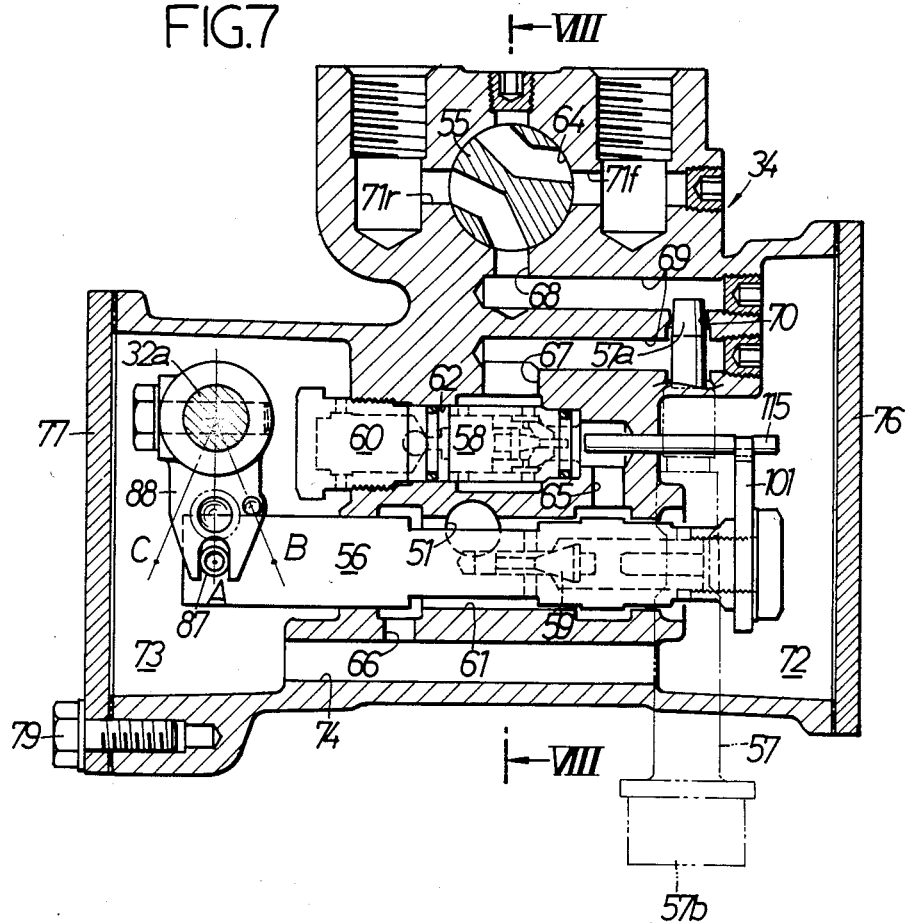
FIG. 7 is a sectional view taken along a line VII—VII in FIG. 3.
Figure 12:
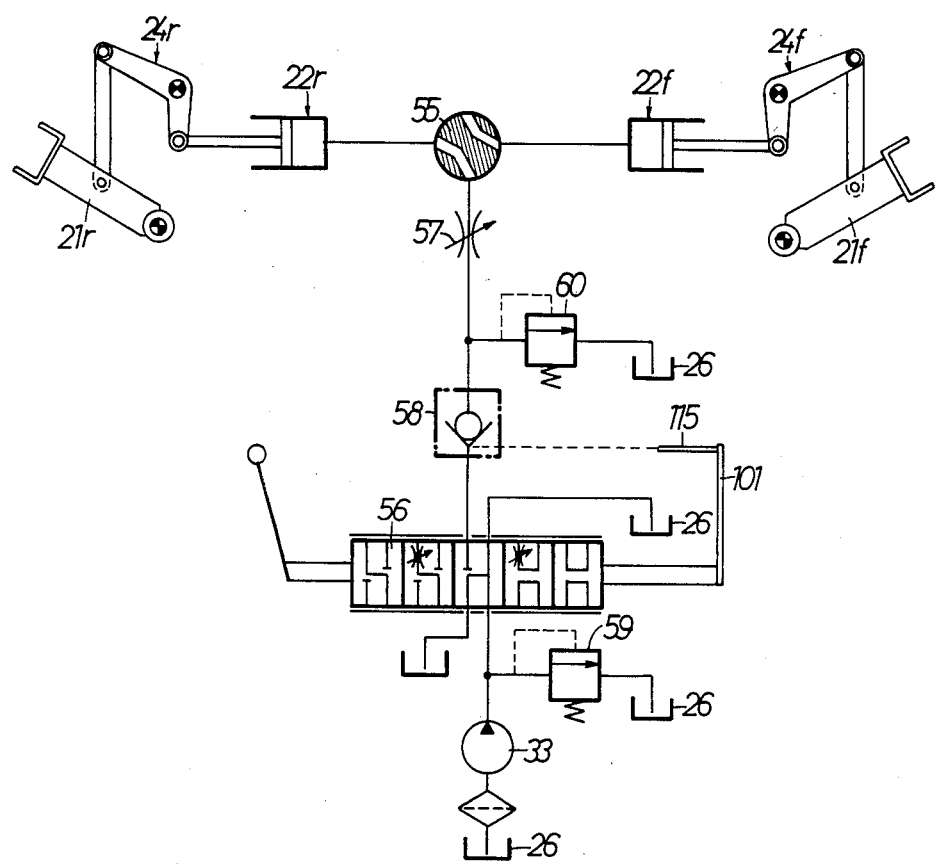
FIG. 12 is a diagram of a hydraulic circuit of the hydraulic system.

As shown in FIGS. 7, 9 and 12, the control valve arrangement 34 comprises a switch valve 55 for selecting the operation of either the front or rear hydraulic cylinder 22f or 22r, a manual valve 56 for controlling supplying of the hydraulic pressure into the selected hydraulic cylinder 22f or 22r and cutting-off of such supplying, a throttle valve 57 for adjusting the operational speed of the individual hydraulic cylinders 22f and 22r and for blocking a flow of the working oil, a check valve 58 for providing the stoppage of returning movement of the individual hydraulic cylinders 22f and 22r, a relief valve 59 for defining an upper limit of the pressure discharged from the hydraulic pump 33, and a pressure control valve 60 adapted to avoid an overload, these valves being contained in the casing 35 in the following manner.

Figure 3:
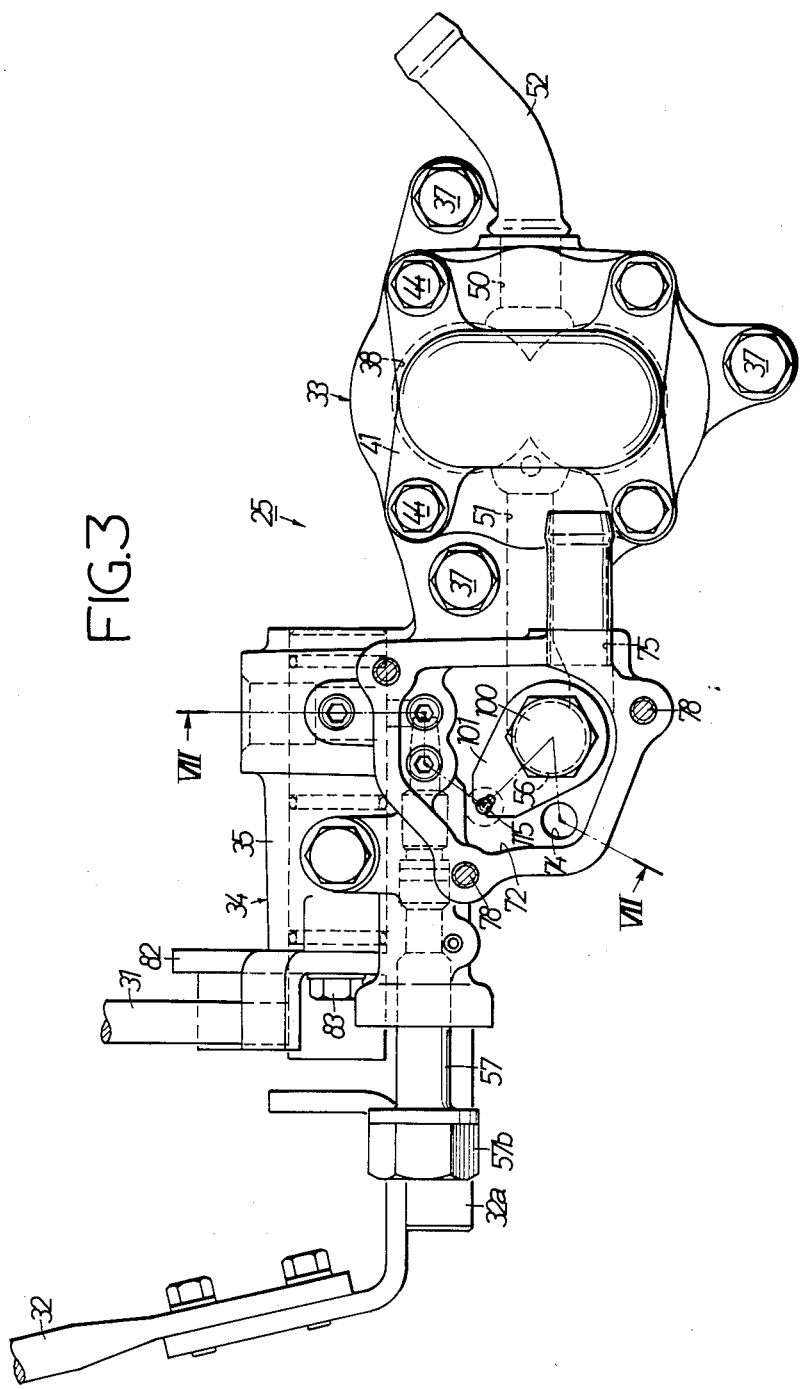
FIG. 3 is a sectional view taken along lines III—III in FIG..2.
Figure 8:
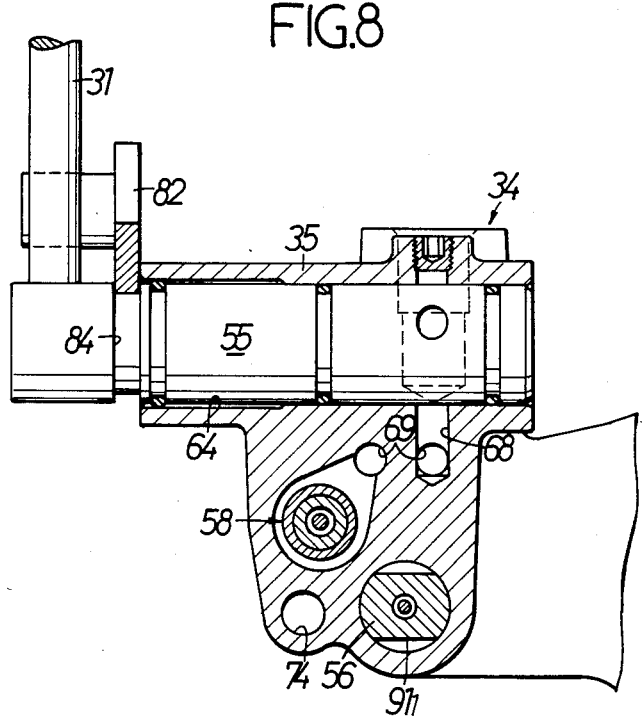
FIG. 8 is a sectional view taken along a lne VIII—VIII in FIG. 7.

As shown in FIGS. 3, 7 and 8, the casing 35 is perforated with a first valve bore 61 extending perpendicular to the direction of arrangement of the hydraulic pump 33 and the control valve arrangement 34, a second valve bore 62 extending above and in parallel to the first valve bore 61, a third valve bore 63 extending above the second valve bore 62 and in the direction of arrangement of the hydraulic pump 33 and the control valve arrangement 34, and a fourth valve bore 64 extending above and in parallel to the third valve bore 63. The manual valve 56 is disposed in the first valve bore 61; the check valve 58 and pressure control valve 60 are in the second valve bore 62; the throtle valve 57 is in the third valve bore 63; and the switch valve 55 is in the fourth valve bore 64. The relief valve 59 is incorporated in the manual valve 56.

Referring to FIG. 9, an outlet of the discharge port 51 in the hydraulic pump 33 is opened directly into the first valve bore 61, thereby permitting the hydraulic pump 33 and the control valve arrangement 34 to communicate with each other.

A feed port 65 and an exit port 66 are opened to the first valve bore 61 with the discharge port 51 interposed between these ports 65 and 66, and an outlet of the feed port 65 is opened into the second valve bore 62. A high pressure port 67 is opened into the second valve bore 62, and a central port 68 is opened into the fourth valve bore 64. A throttling bore 70 coaxial to the third valve bore 63 is made at an intermediate portion of an oil passage 69 connecting the ports 67 and 68. Further, a pair of front and rear output ports 71f and 71r are opened into the fourth valve bore 64 with the central port 68 interposed therebetween, and the hydraulic conduits 29f and 29r leading to the front and rear hydraulic cylinders 22f and 22r are connected to outlets of the output ports 71f and 71r, respectively.

An outlet of the exit port 66 communicates through an oil passage 74 with oil chambers 72 and 73 defined at the longitudinally opposite sides of the casing 35, and a return pipe 28 leading to the oil tank 26 is connected to an outlet 75 opened into the front oil chamber 72. Thus, an oil discharged in the oil chambers 72 and 73 is returned to the oil tank 26.

Figure 5:
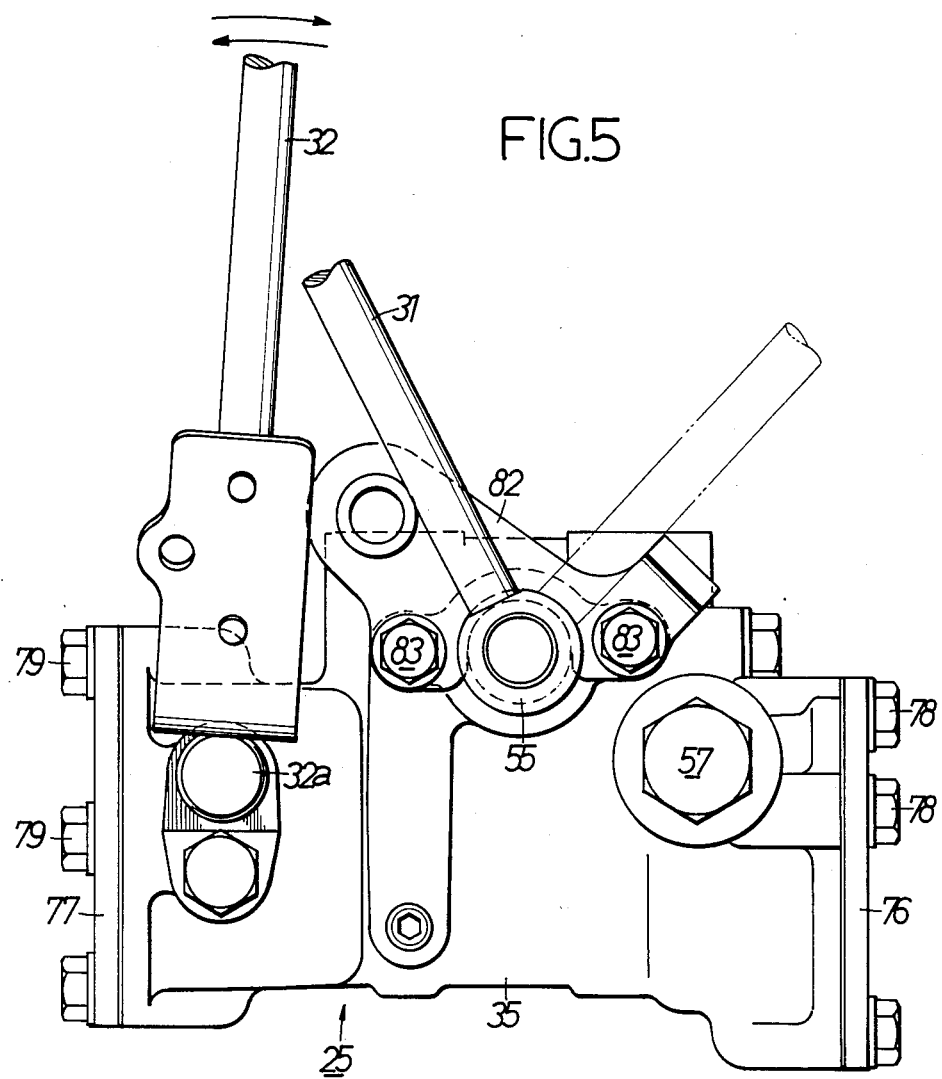
FIG. 5 is a view taken in a direction indicated by an arrow V in FIG. 2.

Respective opened faces of the oil chambers 72 and 73 are closed by front and rear end plates 76 and 77 clamped to the casing 35 by bolts 78 and 79, respectively (see FIG. 5).

Now, the structure of each of the aforesaid valves will be described. First, the switch valve 55 is formed into a cock type rotatably fitted in the fourth valve bore 64 as shown in FIGS. 7 and 8, so that the rotation thereof enables the central port 68 to be selectively put into communication with the front or rear output port 71f or 71r. The switch valve 55 has one end protruded from the right side of the casing 35, and the above-described first control lever 31 is attached to the protruded end. Consequently, the turning operation of the first control lever 31 causes the switch valve 55 to be rotated.

A restriction plate 82 for restricting the range of turning movement of the first control lever 31 is secured to the casing 35 by bolts 83 (see FIG. 5). The restriction plate 82 also functions to prevent slip-out of the switch valve 55 by engaging with a peripheral groove 84 (see FIG. 8) in the switch valve 55.

The manual valve 56 is formed into a spool type slidably fitted in the first valve bore 61 as shown in FIG. 9, and is operable to assume three positions: a central stationary position A, a raised position B at one side and a lowered position C at the other side. A pin 87 is protruded from a side of one end of the manual valve 56, projecting into the rear oil chamber 73, and a fork 88 secured to a turning shaft 32a of the above-described second control lever 32 is engaged with the pin 87. Thus, turning of the second lever 32 causes the manual valve 56 to slide in the bore 61.

The manual valve 56 is provided, in sequence from the left in FIG. 9, with a first land $90_1$, a first larger discharging groove $91_1$ (see FIG. 8), a first smaller groove $92_1$ for raising-throttling (see FIG. 10), a second land $90_2$, a second smaller groove $92_2$ for lowering-throttling (see FIG. 11), and a second larger discharging groove $91_2$. When the valve 56 is in the stationary position A, the discharge port 51 and the exit port 66 communicate with each other through the first larger groove $91_1$, and when the valve 56 is in the raised position B, the first land $90_1$ cuts off the communication between the discharge port 51 and the exit port 66, while the second land $90_2$ cuts off the communication between the feed port 65 and the front oil chamber 72, and at the same time, a communication is permitted between the discharge port 51 and the feed port 65 via first larger groove $91_1$. When the valve 56 is in the lowered position C, the second land $90_2$ cuts off the communication between the discharge port 51 and the feed port 65, while simultaneously permitting a communication between the feed port 65 and the front oil chamber 72 through the second larger groove $91_2$. In individual middle positions between the stationary position A and the raised and lowered positions B and C, the first smaller groove $92_1$ or the second smaller groove $92_2$ intervenes in a flow path for the working oil.

The individual grooves $91_1$, $91_2$, $92_1$ and $92_2$ are provided by chamfering portions opposed to an outer peripheral surface of the manual valve 56. In doing so, a slide surface which cannot be cut by the individual grooves over the entire length of the manual valve 56 is left around the outer periphery of the manual valve 56, thereby providing a satisfactory sliding property to the manual valve 56.

The manual valve 56 is provided with a larger diameter valve chest 93 extending axially, a smaller diameter guide bore 94 coaxially connected to an inner end of the valve chest 93, a through hole 95 adjacent to the valve chest 93 for permitting the guide bore 94 to communicate with the first larger groove $91_1$, and a through hole 96 for opening the valve chest 93 into the front oil chamber 72. An inner end wall of the valve chest 93 is formed as a valve seat 97. Contained in the valve chest 93 are a generally conical valve 98 cooperating with the valve seat 97 and a valve spring 99 for biasing the conical valve 98 in a closing direction, i.e., toward the valve seat 97, these components constituting the above-described relief valve 59.

The conical valve 98 is formed integrally with a valve rod 98a extending across the through hole 95 and a small poston 98b formed at a leading end of the valve rod 98a and slidably received in the guide bore 94.

An opened end of the valve chest 93 is formed into a threaded bore 130, and an adjusting screw 131 for supporting a fixed end of the valve spring 99 and a bolt 100 for plugging the threaded bore 130 are threadedly inserted into the threaded bore 130. In this insertion, an interlocking arm 101 for opening the check valve 58 which will be described hereinafter is clamped between the manual valve 56 and the bolt 100.

A threaded hole 132 is centrally perforated in the bolt 100 to pass therethrough, and a locking screw 133 capable of bearing against an outer end of the adjusting screw 131 is threadedly inserted into the threaded hole 132.

In this way, the relief valve 59 is incorporated in the manual valve 56 and therefore, it is unnecessary to interpose a relief valve in an escape passage diverted from the discharge port of the hydraulic pump into the oil tank, as in the prior art. Moreover, the control valve arrangement 34 can be disposed in close vicinity to the hydraulic pump 33, leading to a compactness of the whole hydraulic pressure control unit 25.

Figure 9A:
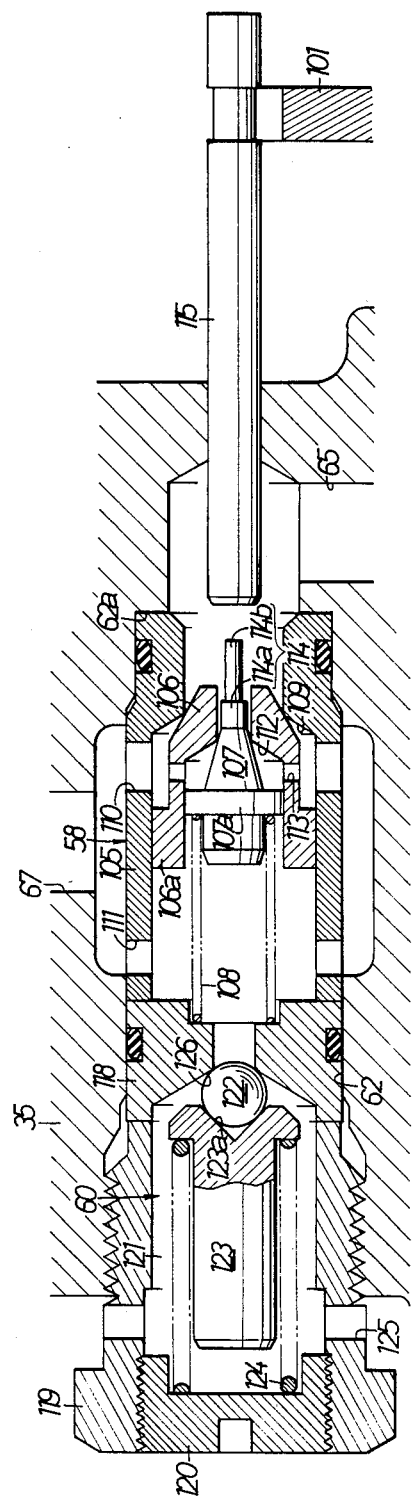
FIG. 9A is an enlarged view of a part of FIG. 9.

As clearly shown in FIG. 9A, the check valve 58 comprises a valve case 105 fitted in the second valve bore 62 and having one end communicating with the feed port 65, a cup-like main valve 106 disposed in the valve case 105, a sub-valve 107 disposed within the main valve 106, and a valve spring 108 for biasing the sub-valve 107 in a closing direction. The aforesaid one end of the valve case 105 is formed to serve as a main valve seat 109 cooperating with the main valve 106, and a piston 106a is integrally connected to that end of the main valve 106 which is opposite to the main valve seat 109. The piston 106a is slidably fitted around an inner peripheral surface of the valve case 105 over its entire periphery to prevent the main valve 106 from declining. In the front and rear of the piston 106a, the valve case 105 is perforated with through holes 110 and 110 for permitting the interior of the valve case 105 to communicate with the high pressure port 67.

An end wall of the cup-like main valve 106 is formed to serve as a sub-valve seat 112 cooperating with the sub-valve 107, and an opening of the sub-valve seat 112 is smaller than that of the main seat 109. At a place spaced from the sub-valve seat 112, a piston 107a slidably fitted around an inner peripheral surface of the main valve 106 over its entire periphery is integrally connected to the sub-valve 107, thereby preventing the sub-valve 107 from declining. Between the piston 107a and the sub-valve seat 112, the main valve 106 is perforated with a through hole 113 for permitting the interior of the main valve 106 to communicate with its outer periphery.

A projecting shaft 114 passed through the sub-valve seat 112 is integrally connected to the sub-valve 107 and is formed into a two-stepped shape including a larger diameter portion 114a on the side of a base end and a smaller diameter portion 114b on the side of a leading end. A valve-opening rod 115 is disposed in an opposed relation to the leading end of the projecting shaft 114. The valve-opening rod 115 is slidably supported on a partition between the second valve bore 62 and the front oil chamber 72 and is connected to the above-described interlocking arm 101 in the front oil chamber 72, so that it can sequentially push the projecting shaft 114 and the main valve 106 during shifting of the manual valve 56 from the stationary position A to the lowered position C.

To urge the one end of the valve case 105 to a stepped portion 62a of the second valve bore 62 for fixing thereof, a partitioning member 118 is fitted in the second valve bore 62 to abut against the other end of the valve case 105, and a hollow bolt 119 is screwed in the second valve bore 62 for fixing the partitioning member 118. The hollow portion of the bolt 119 is closed at its opened end by a threaded plug 120 to define a valve chest 121, and a valve seat 126 communicating with the interior of the valve case 105 is formed on the partitioning member 118 on the side close to the valve chest 121. Contained in the valve chest 121 are a spherical valve 122 cooperating with the valve seat 126, a retainer 123 for retaining the spherical valve 122 in a conical recess 123a at its front face, a valve spring 124 for biasing the spherical valve 122 in a closing direction through the retainer 123, these components constituting the above-described pressure control valve 60.

The valve chest 121 is opened to the rear oil chamber 73 through a through hole 125 perforated in the bolt 119.

As mentioned above, the check valve 58 and the pressure control valve 60 are contained in the same valve bore and hence, the casing for the control valve arrangement is small-sized.

Referring again to FIG. 9, the throttle valve 57 is screwed in the third valve bore 63. The throttle valve 57 is provided at its inner end with a tapered portion 57a inserted in the throttling hole 70 and at its outer end with a hexagonal head portion 57b, so that rotation of a spanner applied to the head portion 57b enables the tapered portion 57a to be advanced and retreated depending on the direction of such rotation for increasing or decreasing the opened degree of the throttling hole 70, and also enables the throttling hole 70 to be closed at an advance limit.

Description will be made of the operation of this embodiment. FIG. 9 shows the manual valve 56 in the stationary position A. If the hydraulic pump 33 is operating in this state, a working oil drawn from the oil tank 26 and discharged into the discharge port 51 by the hydraulic pump 33 is passed through the first larger groove $91_1$ of the manual valve 56, the exit port 66, the oil passage 74 and the front oil chamber 72 back to the oil tank 26 without any resistance and hence, there is no high hydraulic pressure developed in the discharge port 51.

At this time, if the switch valve 55 is in a position to permit the communication between the central port 68 and the rear output port 71r, a hydraulic pressure developed in the hydraulic chamber of the rear hydraulic cylinder 22r by the own weight of the rear lift arm 21r (in practice, the weight of a working machine connected thereto is added) is transmitted through the switch valve 55, the throttling hole 70 and the high pressure port 67 into the valve case 105 of the check valve 58 and acts on the back surfaces of both of the main and sub valves 106 and 107 to maintain these valves in their closed state, so that the working oil cannot flow out of the rear hydraulic cylinder 22r, and the rear lift arm 21r can maintain its current position.

If the working machine connected to the hitch box 20r of the rear lift arm 21r receives an overload in a lowering direction during working, the hydraulic pressure within the valve case 105 of the check valve 58 correspondingly increases, and the spherical valve 122 of the pressure control valve 60 receives such hydraulic pressure on its front surface to open while compressing the valve spring 124, so that any excessive hydraulic pressure is released through the valve seat 126, the valve chest 121 and the through hole 125 into the rear oil chamber 73. Thus, the working machine can be protected against the overload.

Now, as the manual valve 56 is being shifted to the raised position B by operation of the second control lever 32 to move up the rear lift arm 21r, at first, the communication between the discharge port 51 and the exit port 66 is cut off by the first land $90_1$ and at the same time, the communication between the feed port 65 and the front oil chamber 72 is cut off by the second land $90_2$. This causes the hydraulic pump 33 to produce a hydraulic pressure at the discharge port 51. At the phase where the discharge port 51 is in communication with the feed port 65 through the first smaller groove $92_1$, that hydraulic pressure is transmitted toward the feed port 65 while being subjected to a throttling action at the first smaller groove $92_1$ and then acts on the front surface of the main valve of the check valve 58 to push it to open. Then, this hydraulic pressure is passed through the main valve seat 109, the through hole 110 in the valve case 105, the high pressure port 67, the throttling hole 70, the central port 68, the switch valve 55 and the rear output port 71r into the hydraulic chamber in the rear hydraulic cylinder 22r, and the transmitted hydraulic pressure drives the piston 23r to move up the rear lift arm 21r. In this case, the speed of this upward movement is controlled to a decreased level mainly by a throttling action of the first smaller groove $92_1$ in the manual valve 56. The speed of this slow upward movement is finely controllable by adjusting the opened degree of the throttling hole 70 by the throttle valve 57.

When the manual valve 56 has been shifted to the raised position B, communication is permitted between the discharge port 51 and the feed port 65 through the first larger groove $91_1$ and this causes the speed of hydraulic pressure transmitted to be increased, so that the speed of rising of rear lift arm 21r increases. Even in this case, however, the throttle valve 57 properly throttles the throttling hole 70 to restrict an upper limit of the speed of hydraulic pressure transmitted and therefore, a rapid upward movement of the rear lift arm 21r is suppressed.

During the above operation, a pressure discharged from the hydraulic pump 33 acts on the front surface of the conical valve 98 of the relief valve 59 via the through hole 95 and therefore, if that discharged pressure increases in excess of a specified value determined by a set load of the valve spring 99, the conical valve 98 is opened against a force of the valve spring 99 to release the excess portion of the discharged pressure through the valve chest 93 and the through hole 96 into the front oil chamber 72. If the discharged pressure from the hydraulic pump 33 is returned to the specified value as a result of this release of excess pressure, the conical valve 98 is brought back into its closed state by the force of the valve spring 99.

To readjust the set load of the valve spring 99, the locking screw 133 is first removed from the threaded hole 132, and the adjusting screw 131 is clockwise or counter-clockwise turned for adjustment of advance or retreat by a driver inserted in the threaded hole 132. By doing so, the set load of the valve spring can be adjusted. After this adjustment, the locking screw 133 is screwed again into the threaded hole 132 and tightened. Then, the screw 133 can be caused to bear against the outer end of the adjusting screw 131 to fix it in place.

It should be noted that such means for readjusting the set load of the valve spring can be incorporated even into the pressure control valve 60.

During such opening and closing motion of the conical valve 98, the inclination of the conical valve 98 can be prevented by the fact that the small piston 98b integral with the conical valve 98 slides in the guide bore 94. In addition, disordered motion of the conical valve 98 can be also prevented by oil flowing through a sliding clearance between the small piston 98b and the guide bore 94.

If the manual valve 56 is then shifted past the stationary position A toward the lowered position C to move down the rear lift arm 21r, the feed port 65 is first cut off from communication with the discharge port 51 by the second land $90_2$, while at the same time being put into communication with the front oil chamber 72 through the second small groove $92_2$, and then, the projecting rod 114 of the sub-valve 107 in the check valve 58 is pushed by the valve-opening rod 115 to open the valve 107. A pressure receiving area of the sub-valve 107 faced into the valve case 105 is relatively small and the closing force acting on the sub-valve 107 by a high hydraulic pressure within the valve case 105 is relatively small. Thus, the sub-valve 107 can be easily opened by a light force of the valve-opening rod 115.

The sub-valve 107 is suppressed from its inclination by the sliding movement of the piston 107a integral with the sub-valve 107 on the inner peripheral surface of the main valve 106 over its entire periphery and hence, the opening and closing motion of the sub-valve 107 can be properly achieved at all times. In addition, the working oil is passed via the through hole 113 out of and into the main valve 106 with the sliding movement of the piston 107a, so that the pressure across the piston 107a is balanced, resulting in a smooth opening or closing motion of the sub-valve 107.

When the sub-valve 107 has been opened, the hydraulic pressure within the rear hydraulic cylinder 22r is released into the front oil chamber 72 sequentially via the switch valve 55, the throttle valve 70, the hgh pressure port 67, the through hole 110 in the valve case 105, the through hole 113 in the main valve 106, the sub-valve seat 112, the feed port 65 and the second smaller groove $92_2$, so that the rear lift arm 21r can be lowered or moved down. The lowering speed is controlled to a decreased level by throttling actions of the sub-valve 107 and the second smaller groove $92_2$.

The opened degree of the sub-valve 107 is controlled at a smaller level at the early stage of the valve-opening motion by the larger diameter portion 114a of the projecting shaft 114 and at a larger level at the latter stage of the valve-openign motion and hence, the throttling action by the sub-valve 107 varies in two stages, i.e., a weaker stage and a stronger stage in response to the advance movement of the valve-opening rod 115. This makes it possible to achieve the control for decreasing the lowering speed of the rear lift arm 21r at two stage: a slower stage and a faster stage. Further, that speed is finely controllable by adjusting the opened degree of the throttling hole 70 by the throttle valve 57.

A difference in pressures within and outside the main valve 106 is decreased when the sub-valve 107 has been opened, and hence, if the valve-opening rod 115 is further advanced to push the main valve 106, the latter can be lightly opened.

When the main valve 106 has been opened, releasing of the hydraulic pressure in the rear hydraulic cylinder 22r is rapidly conducted through the main valve seat 109, so that the speed of downward movement of the rear lift arm 21r is increased. In this case, however, if the second smaller groove $92_2$ still lies between the feed port 65 and the front oil chamber 72, the increase in speed of downward movement of the rear lift arm 21r is moderately restrained.

When the manual valve 56 has been shifted to the lowered position C, the feed port 65 and the front oil chamber 72 are brought into communication with each other through the second larger groove $91_2$, so that the rate of hydraulic pressure released from the rear hydraulic cylinder 22r is further increased to provide a maximum speed of downward movement of the rear lift arm 21r. This maximum speed of downward movement is limited by the opened degree of the throttling hole 70 adjusted by the throttle valve 57.

While the upward and downward movements of the rear lift arm 21r have been described above, it will be understood that if the central port 68 is brought into communication with the front output port 71f by switching operation of the switch valve 55, the front lift arm 21f can be moved up and down by an operation similar to the above-described operation.

When the front and rear lift arms 21f and 21r are stopped at suitable raised positions and the tractor 1 is left to stand for a long time, the throttle valve 57 is fully shut off to close the throttling hole 70. Accordingly, releasing of the hydraulic pressure from the rear hydraulic cylinder 22r is reliably blocked by the throttle valve 57 interposed between the pressure control valve 60 and the switch valve 55 in the hydraulic circuit, for example, even if the rear output port 71r connected to the rear hydraulic cylinder 22r is in communication with the central port 68 through the switch valve 55 as shown in FIG. 9. Thus, the rear lift arm 21r can be maintained stationary for a long time, regardless of the magnitude of a load applied to the rear lift arm 21r. On the other hand, because the front output port 71f connected to the front hydraulic cylinder 22f is in a closed state by the switch valve 55, the front lift arm 21f can be also maintained stationary for a long time, regardless of the magnitude of a load applied to the front lift arm 21f.

What is claimed is:

1. A hydraulic system for a working vehicle comprising:
   a hydraulic cylinder on the working vehicle and operable to raise and lower a working machine;
   a hydraulic pump;
   an oil tank;
   a manual valve constructed to be shiftable to a stationary position in which a working oil discharged from said hydraulic pump is released into said oil tank, a raised position in which the working oil is supplied into said hydraulic cylinder, and a lowered position in which the working oil supplied into the hydraulic cylinder is passed back into the oil tank; and a check valve interposed in an oil passage between said manual valve and said hydraulic cylinder for permitting a flow of the working oil in a normal direction from said manual valve toward said hydraulic cylinder and blocking a flow of the working oil in a reverse direction, wherein said check valve comprises a main valve seat interposed within the oil passage between said manual valve and said hydraulic cylinder to permit the flowing of the working oil therethrough, a main valve cooperating with said main valve seat to permit flowing of the working oil in said normal direction and to block flowing of the working oil in said reverse direction; a sub-valve seat formed in said main valve to permit flowing of the working oil therethrough; a sub-valve having a pressure-receiving area smaller than that of said main valve seat and cooperating with said sub-valve seat to permit flowing of the working oil in said normal direction and to block flowing of the working oil in said reverse direction; and a valve-opening rod mounted in an opposed relation to said main and sub valves and operable to open said sub-valve prior to said main valve, said valve opening rod being operatively connected to said manual valve such that the rod operates in the course of shifting of said manual valve from the stationary position to the lowered position;

said manual valve including a spool slidable in a valve bore in a casing to which bore are opened a discharge port of said hydraulic pump, an exit port connected to said oil tank and a feed port connected to said hydraulic cylinder, said manual valve being operable to permit said feed port to selectively communicate with said discharge port and said exit port; and wherein an oil passage is provided in said manual valve for interconnecting said discharge port and said oil tank and a relief valve is interposed in said oil passage in the manual valve to open when a pressure discharged from said hydraulic pump reaches not less than a specified value.

2. A hydraulic system according to claim 1, wherein said manual valve has a groove always communicating with the discharge port of said hydraulic pump, and said relief valve includes a valve seat formed within said manual valve to communicate with said groove, a valve chest always communicating with said oil tank, a valve body contained in said valve chest to cooperate with said valve seat, and a valve spring for biasing said valve body in a closing direction.

3. A hydraulic system according to claim 1, wherein the main valve seat of said check valve is formed at one end of the valve case interposed in said oil passage, said main valve being formed into a cup-shape and contained in said valve case, a piston is integrally connected to said main valve and slidably fitted on an inner peripheral surface of said valve case, and through holes are perforated in said valve case at positions in front and rear of said piston for permitting communication of interior and exterior of said valve case, and wherein said sub-valve is contained within said main valve, a piston is provided on said sub-valve and is slidably fitted on an inner peripheral surface of said main valve over an entire periphery of the main valve, and a through hole is perforated between the piston on said sub-valve and said sub-valve seat for permitting communication of interior and exterior of said main valve.

4. A hydraulic system according claim 1 or 3, wherein the main and sub valve seats of said check valve are formed to have a larger opening and a smaller opening, respectively; wherein a throttle valve is interposed in series to said check valve in the oil passage between said manual valve and said hydraulic cylinder, and wherein first and second smaller grooves are formed in said manual valve for providing a throttling resistance to the working oil passing through said manual valve at positions of the manual valve intermediate between the stationary position and the raised position and between the stationary position and the lowered position, respectively.

5. A hydraulic system according to claim 4, wherein said sub-valve is integrally formed with a projecting shaft which passes through the small opening in said sub-valve seat and is capable of abutting against said valve-opening rod, said projecting shaft being stepwise reduced in diameter toward a leading end thereof.

6. A hydraulic system according to claim 1, wherein said valve-opening rod is connected to said manual valve for integral movement via an interlocking arm, said valve-opening rod being movable by a manually operable control lever which is fixed to the manual valve.

7. A hydraulic system for a working vehicle comprising:

a plurality of hydraulic cylinders on the working vehicle each hydraulic cylinder of said plurality of hydraulic cylinders being operable to raise and lower a selected one working machine of a plurality of working machines on said vehicle;

a hydraulic pump;

an oil tank;

a manual valve constructed to be shiftable to a stationary position in which a working oil discharged from the hydraulic pump is released into the oil tank, a raised position in which the working oil is supplied into the hydraulic cylinder of a selected one working machine of said plurality of working machines, and a lowered position in which the working oil supplied into said hydraulic cylinder is passed back into the oil tank;

a switch valve interposed in an oil passage between said manual valve and said hydraulic cylinders for permitting an output side of said manual valve to selectively communicate with each cylinder of said plurality of hydraulic cylinders;

a pressure control valve which is opened upon application of an overload to said hydraulic cylinder selectively put into communication by said switch valve, thereby escaping the overload working oil within said hydraulic cylinder into the oil tank; and a throttle valve between said switch valve and said pressure control valve for throttling the oil passage to limit the operational speed of the hydraulic cylinder selectively put into communication by said switch valve and for closing said oil passage.

8. A hydraulic system according to claim 7, further including a check valve interposed in said oil passage for permitting flowing of the working oil in a normal direction from said manual valve toward said hydraulic cylinder and for blocking flowing of the working oil in a reverse direction, wherein first and second axially aligned valve chests are defined in a valve bore in a casing by dividing said bore by a partitioning member, said first valve chest interiorly communicating with said hydraulic cylinder and having at one end a valve seat communicating with said hydraulic pump, said check valve being constituted by containing, in the first valve chest, a valve body cooperating with the valve seat and a valve spring for biasing the valve body in a closing direction while said second valve chest interiorly communicating with said oil tank and having at one end a second valve seat communicating with said first valve chest, said pressure control valve being constituted by containing, in the second valve chest, a second valve body cooperating with the second valve seat and a second valve spring for biasing the second valve body in a closing direction.

9. A hydraulic system according to claim 8, wherein an adjusting screw for supporting the fixed end of the valve spring of said pressure control valve is threadedly inserted into a member defining the second valve chest for advancing and retreating movement, and a locking screw is threadedly inserted into said member and capable of bearing against an outer end of said adjusting screw to fix the threadedly inserted position of said adjusting screw.

10. A hydraulic system according to claim 7, further including a relief valve for escaping that part of hydraulic pressure discharged from said hydraulic pump which exceeds a specified value into said oil tank, said relief valve including a valve body movable in an opening direction against a valve spring by the action of the hydraulic pressure in excess of said specified value, wherein a locking screw is threadedly inserted into a member into which an adjusting screw for supporting a fixed end of said valve spring is threadedly inserted for advancing and retreating movement, said locking screw being capable of bearing against an outer end of said adjusting screw to fix the threadedly inserted position of the adjusting screw.

11. A hydraulic system according to claim 10, wherein said relief valve is housed in a body of the manual valve so as to be interposed in an oil passage extending between two through holes bored through the body of the manual valve, one of the two through holes being always exposed to an oil pressure fed from the hydraulic pump and the other through hole leading to the oil tank.

12. A hydraulic system according to claim 7, wherein said pressure control valve comprises a valve body which is exposed at one side thereof to said overload working oil and receives at an opposite side thereof a valve closing force from a resilient means, the pressure control valve further having a through hole leading to the oil tank and being adapted to escape the overload working oil to the oil tank via the through hole when the valve body assumes an open position against the force of the resilient means.

13. A hydraulic system for a working vehicle comprising:
a hydraulic cylinder on the working vehicle and operable to raise and lower a working machine;
a hydraulic pump;
an oil tank;
a manual valve constructed to be shiftable to a stationary position in which a working oil discharged from said hydraulic pump is released into said oil tank, a raised position in which the working oil is supplied into said hydraulic cylinder, and a lowered position in which the working oil supplied into the hydraulic cylinder is passed back into the oil tank; and
a check valve interposed in an oil passage between said manual valve and said hydraulic cylinder for permitting a flow of the working oil in a normal direction from said manual valve toward said hydraulic cylinder and blocking a flow of the working oil in a reverse direction, wherein said check valve comprises a main valve seat interposed within the oil passage between said manual valve and said hydraulic cylinder to permit the flowing of the working oil therethrough; a main valve cooperating with said main valve seat to permit flowing of the working oil in said normal direction and to block flowing of the working oil in said reverse direction; a sub-valve seat formed in said main valve to permit flowing of the working oil therethrough; a sub-valve having a pressure-receiving area smaller than that of said main valve seat and cooperating with said sub-valve seat to permit flowing of the working oil in said normal direction and to block flowing of the working oil in said reverse direction; and a valve-opening rod mounted in an opposed relation to said main and sub valves and operable to open said sub-valve prior to said main valve, said valve opening rod being operatively connected to said manual valve such that the rod operates in the course of shifting of said manual valve from the stationary position to the lowered position, main and sub valve seats of said check valve being formed to have a larger opening and a smaller opening, respectively; wherein a throttle valve is interposed in series to said check valve in the oil passage between said manual valve and said hydraulic cylinder, and wherein first and second smaller grooves are formed in said manual valve for providing a throttling resistance to the working oil passing through said manual valve at positions of the manual valve intermediate between the stationary position and the raised position and between the stationary position and the lowered position, respectively.

14. A hydraulic system according to claim 13, wherein said sub-valve is integrally formed with a projecting shaft which passes through the small openin in said sub-valve seat and is capable of abutting against said valve-opening rod, said projecting shaft being stepwise reduced in diameter toward a leading end thereof.

* * * * *